(12) United States Patent
Grau et al.

(10) Patent No.: US 12,284,681 B2
(45) Date of Patent: Apr. 22, 2025

(54) COMMUNICATION SYSTEM

(71) Applicant: NEC Corporation, Tokyo (JP)

(72) Inventors: Maxime Grau, Surrey (GB); Chadi Khirallah, Surrey (GB); Yuhua Chen, Surrey (GB); Neeraj Gupta, Surrey (GB)

(73) Assignee: NEC CORPORATION, Tokyo (JP)

( * ) Notice: Subject to any disclaimer, the term of this patent is extended or adjusted under 35 U.S.C. 154(b) by 334 days.

(21) Appl. No.: 17/625,858

(22) PCT Filed: Feb. 5, 2021

(86) PCT No.: PCT/JP2021/004223
§ 371 (c)(1),
(2) Date: Jan. 10, 2022

(87) PCT Pub. No.: WO2021/161907
PCT Pub. Date: Aug. 19, 2021

(65) Prior Publication Data
US 2022/0272759 A1    Aug. 25, 2022

(30) Foreign Application Priority Data
Feb. 14, 2020 (GB) .................................... 2002086

(51) Int. Cl.
*H04W 74/0833* (2024.01)
(52) U.S. Cl.
CPC .............. *H04W 74/0833* (2013.01)

(58) Field of Classification Search
USPC .... 370/230, 252, 310.2, 311, 328, 329, 389, 370/395.43, 443
See application file for complete search history.

(56) References Cited

U.S. PATENT DOCUMENTS

| | | |
|---|---|---|
| 2015/0156690 A1 | 6/2015 | Futaki |
| 2015/0327133 A1 | 11/2015 | Yiu et al. |
| 2018/0310257 A1 | 10/2018 | Papasakellariou |
| 2020/0045742 A1 | 2/2020 | Suzuki et al. |

(Continued)

FOREIGN PATENT DOCUMENTS

| | | |
|---|---|---|
| CN | 110192427 A | 8/2019 |
| EP | 3569029 A1 | 11/2019 |

(Continued)

OTHER PUBLICATIONS

International Search Report for PCT Application No. PCT/JP2021/004223, mailed on May 17, 2021.

(Continued)

*Primary Examiner* — Nguyen H Ngo (57) ABSTRACT

A system is disclosed in which an item of user equipment (UE) obtains a reference signal received power (RSRP) threshold value for transmitting a random access message (MsgA) comprising both a preamble part and a Physical Uplink Shared Channel (PUSCH) transmission part. The UE obtains information identifying at least one respective offset associated with at least one priority level, and determines a type of random access procedure (two-step or legacy random access procedure) to be performed based on an RSRP measured by the UE, the RSRP threshold value, and a priority level associated with the UE.

8 Claims, 5 Drawing Sheets

(56) References Cited

U.S. PATENT DOCUMENTS

| | | | |
|---|---|---|---|
| 2020/0053777 A1 | 2/2020 | Babaei et al. | |
| 2020/0107369 A1 | 4/2020 | Jeon et al. | |
| 2021/0022176 A1 | 1/2021 | Yang et al. | |
| 2021/0051672 A1* | 2/2021 | Rastegardoost | H04W 74/006 |
| 2022/0279591 A1* | 9/2022 | Zhao | H04W 74/0808 |
| 2022/0287108 A1* | 9/2022 | Takahashi | H04W 74/0833 |

FOREIGN PATENT DOCUMENTS

| | | |
|---|---|---|
| JP | 2017-514396 A | 6/2017 |
| WO | 2014/007336 A1 | 1/2014 |
| WO | 2018/144936 A1 | 8/2018 |
| WO | 2018/194436 A1 | 10/2018 |
| WO | 2019/101201 A1 | 5/2019 |

OTHER PUBLICATIONS

English translation of Written opinion for PCT Application No. PCT/JP2021/004223, mailed on May 17, 2021.

GB Office Action for GB Application No. GB2002086.3, mailed on Aug. 7, 2020.

3GPP TS 22.261 V16.10.0, "Service requirements for the 5G system", Dec. 2019, pp. 1-72.

3GPP TS 38.331 V15.8.0, "Radio Resource Control (RRC) protocol specification", Dec. 2019, pp. 1-532.

3GPP TS 22.368 V13.1.0, "Service requirements for Machine-Type Communications", Dec. 2014, pp. 1-26.

Next Generation Mobile Networks, "NGMN 5G White Paper", V1.0. Feb. 17, 2015, pp. 1-125.

Panasonic, "Discussion on the RACH Type Selection", 3GPP TSG-RAN WG2 Meeting#107, Prague, Czech Republic, Aug. 26-Aug. 30, 2019, R2-1909238, pp. 1-3.

Panasonic, "Loading Control in the RACH Type Selection", 3GPP TSG-RAN WG2 Meeting#108, Reno, USA, Nov. 18-Nov. 22, 2019, R2-1916450, pp. 1-2.

CMCC, "Further discussion on RA type selection", 3GPP TSG-RAN WG2 Meeting #107bis, Chongqing, Oct. 14-18, 2019, R2-1912954, pp. 1-2.

Japanese Office Action for JP Application No. 2022-504710, mailed on Nov. 22, 2022 with English Translation.

R2-1916269, Perspecta Labs, CISA ECD, AT & T, T-Mobile, Verizon, Ericsson, Qualcomm, "RA Prioritization for MPS for 2-step RACH", RA Prioritization for MPS, 3GPP TSG-RAN WG2 Meeting #108, Reno, Nevada, Nov. 18, 2019-Nov. 22, 2019.

R2-1816478, MediaTek Inc., "LBT for Random Access in NR-U", 3GPP TSG-RAN2#104, Spokane, USA, Nov. 12-16, 2018.

R2-1911501, ZTE Corporation, Sanechips, CATT, "Consideration on the load balance between 2-step RACH and 4-step RACH", 3GPP TSG-WG2 Meeting #107, Prague, Czech Republic, Aug. 26-30, 2019.

CN Office Action for Chinese Patent Application No. 202180013554.3, mailed on Jun. 24, 2024 with English Translation.

Min Xu et al., "5G unlicensed band networking technology", Telecommunications Science, 35, 07, Jul. 10, 2019, pp. 2019178-1 to 2019178-9.

Ziyang Li et al., "On Contention-based 2-step Random Access Procedure", 2020 International Conference on Wireless Communications and Signal Processing (WCSP), pp. 771-776.

* cited by examiner

COMMUNICATION SYSTEM

COMMUNICATION SYSTEM

This Application is a National Stage Entry of PCT/JP2021/004223 filed on Feb. 5, 2021, which claims priority form British Patent Application GB2002086.3 filed Feb. 14, 2020, the contents of all of which are incorporated herein by reference, in their entirety.

TECHNICAL FIELD

The present invention relates to a communication system. The invention has particular but not exclusive relevance to wireless communication systems and devices thereof operating according to the 3rd Generation Partnership Project (3GPP) standards or equivalents or derivatives thereof (including LTE-Advanced and Next Generation or 5G networks). The invention has particular, although not necessarily exclusive relevance to the so-called random access procedure.

BACKGROUND ART

Recent developments of the 3GPP standards are referred to as the Long Term Evolution (LTE) of Evolved Packet Core (EPC) network and Evolved UMTS Terrestrial Radio Access Network (E-UTRAN), also commonly referred as '4G'. In addition, the term '5G' and 'new radio' (NR) refer to an evolving communication technology that is expected to support a variety of applications and services, Various details of 5G networks are described in, for example, the 'NGMN 5G White Paper' V1.0 by the Next Generation Mobile Networks (NGMN) Alliance, which document is available from https://www.ngmn.org/5g-white-paper.html. 3GPP intends to support 5G by way of the so-called 3GPP Next Generation (NextGen) radio access network (RAN) and the 3GPP NextGen core network.

Under the 3GPP standards, a NodeB (or an 'eNB' in LTE, 'gNB' in 5G) is the base station via which communication devices (user equipment or 'UE') connect to a core network and communicate to other communication devices or remote servers. For simplicity, the present application will use the term base station to refer to any such base stations.

For simplicity, the present application will use the term mobile device, user device, or UE to refer to any communication device that is able to connect to the core network via one or more base stations.

Communication devices might be, for example, mobile communication devices such as mobile telephones, smartphones, user equipment, personal digital assistants. laptop/tablet computers, web browsers, e-book readers and/or the like. Such mobile (or even generally stationary) devices are typically operated by a user. However, 3GPP standards also make it possible to connect so-called 'Internet of Things' (IoT) devices (e.g. Narrow-Band IoT (NB-IoT) devices) to the network, which typically comprise automated equipment, such as various measuring equipment, telemetry equipment, monitoring systems, tracking and tracing devices, in-vehicle safety systems, vehicle maintenance systems, road sensors, digital billboards, point of sale (POS) terminals, remote control systems, and the like. Effectively, the Internet of Things is a network of devices (or "things") equipped with appropriate electronics, software, sensors, network connectivity, and/or the like, which enables these devices to collect and exchange data with each other and with other communication devices. It will be appreciated that IoT devices are sometimes also referred to as Machine-Type Communication (MTC) communication devices or Machine-to-Machine (M2M) communication devices.

For simplicity, the present application often refers to mobile devices in the description but it will be appreciated that the technology described can be implemented on any communication devices (mobile and/or generally stationary) that can connect to a communications network for sending/receiving data, regardless of whether such communication devices are controlled by human input or software instructions stored in memory.

The core network (i.e. the 'EPC' in case of LTE and '5GC' in 5G) typically hosts functionality for subscriber management, mobility management, charging, security, and call/session management (amongst others), and provides connection for communication devices to external networks, such as the Internet.

Before a UE can communicate data via a base station, it needs to perform a so-called (contention-based) random access procedure with the base station serving the cell in which the UE is located. Currently, in Release 15, the random access procedure is a four-step procedure. In the first step (referred to as 'Msg1'), the UE transmits a Physical Random Access Channel (PRACH) preamble. If the base station detects the preamble, the base station responds with a random access response (RAR), also known as 'Msg2'. The RAR includes the detected preamble identifier, a time-advance command, a temporary C-RNTI (TC-RNTI), and an uplink grant for scheduling a Physical Uplink Shared Channel (PUSCH) transmission from the UE (referred to as 'Msg3'). The UE transmits Msg3 as scheduled and includes an identifier for contention resolution. Upon receiving Msg3, the network transmits a contention resolution message, also known as 'Msg4', with the contention resolution identifier. If the UE successfully receives Msg4, and if it finds its contention resolution identifier, it sends an acknowledgement on the Physical Uplink Control Channel (PUCCH), which completes the four-step random access procedure.

From Release 16 of the 3GPP standards, a two-step random access procedure has been proposed (in addition to the currently used four-step Random Access procedure). The two-step random access is mainly intended for supporting (Ultra) Low Latency Communications, 10 ms control plane latency, fast handover, efficient channel access in unlicensed spectrum, and transmission of small data packets, amongst others.

As can be seen, the four-step random access procedure requires two round-trip cycles between the UE and the base station. The two-step random access procedure aims to reduce latency and control-signaling overhead by using a single round trip cycle between the UE and the base station. Effectively, this is achieved by combining the UE's PRACH preamble (Msg1) transmission and the scheduled PUSCH transmission (Msg3) into a single message (referred to as 'MsgA'). Similarly, the random-access response (RAR/Msg2) from the base station to UE and the contention resolution message (Msg4) are combined in the two-step random access procedure (and referred to as 'MsgB').

Regarding power threshold(s) for MsgA of the two-step random access procedure, the current 3GPP specifications and drafts propose using two different received target power levels for the PRACH part (msgA-PRACH) and the PUSCH part (msgA-PUSCH) of the message in order to ensure that both parts can be decoded by the receiver (base station/gNB).

For the PRACH part, the initial random access preamble power is specified via the 'preambleReceivedTargetPower' information element.

[Math. 1]

For the PUSCH part, the initial random access preamble power to be used by the UE is given by the following formula:

$$P_{PUSCH}(i) = \min(P_{CMAX}, [MsgA]preambleReceivedTarget3Power + \Delta_{MsgA\_PUSCH} + 10\log_{10}(2^{\mu}M_{RB}^{PUSCH}(i)) + \alpha PL(i) + \Delta_{TF}(i) + \Delta_{rampup}(i))$$

The parameter $\Delta_{msgA\_PUSCH}$ is an offset relative to the preamble received target power that could be configured for the two-step random access procedure. If the parameter is absent, the parameter 'deta_preamble_msg3' of the four-step random access procedure is used instead.

UEs need to choose between two-step random access and legacy four-step random access (i.e. whether to transmit Msg1 or MsgA). Access to two-step random access is limited because it is less robust than the legacy procedure (as the uplink PUSCH transmission is not synchronised) and it requires relatively bigger (pre-allocated) PUSCH formats to accommodate UEs with poor channel quality. The resources for two-step random access are also more likely to be congested than legacy random access resources because PUSCH resources require more spectrum than preambles 11) only (i.e. Msg1) and multiple preambles are mapped to a single PUSCH resource unit (PRU). However, it will be appreciated that the two-step random access procedure may be used in any cell in Rel-15 NR (regardless of cell size).

In addition, the RAN2 work group of 3GPP agreed to control two-step random access load using a Reference Signal Received Power (RSRP) threshold that both limits access for low channel quality UEs for better robustness and reduces collisions (less coverage means fewer UEs). This RSRP threshold is given by the 'msgA-rsrp-Threshold' parameter which is broadcast as part of the system information (in 'SysteminformationType1' or 'SIB1'). Effectively, the msgA-rsrp-Threshold parameter specifies an RSRP threshold for selection between the two-step random access type and the four-step random access type (when both types of random access resources are configured).

SUMMARY OF INVENTION

The inventor has realised that since the selection of the appropriate random access procedure (two-step or four-step) is based on the RSRP threshold, i.e. radio quality, it mainly depends on UE location and not on UE category/priority, as originally intended. A UE that can attempt four-step random access can technically also attempt two-step random access (note: coverage can be affected by the msgA-PUSCH power offset compared to msg3-PUSCH).

Consequently, while RSRP threshold can effectively reduce access load, the network does not control how many UEs have good/bad channel quality since it is mainly dependent on the location of the UEs (relative to the base station). Thus, RSRP threshold appears to be an inaccurate (over)load control mechanism. For example, low priority UEs located close to the cell centre (and hence above the applicable RSRP threshold) may have access to two-step random access and cause collisions with other random access transmissions (since there is usually a large number of low-priority users in a cell). On the other hand, high priority users near the cell-edge (and hence below the applicable RSRP threshold) may not be allowed to use the two-step random access procedure at all and they may suffer delays (compared to those users that can use the two-step procedure).

In summary, RSRP threshold does not allow a base station to accurately achieve load control across the entire coverage area of its cell(s). Accordingly, preferred example embodiments of the present invention aim to provide methods and apparatus which address or at least partially deal with one or more of the above issues.

Although for efficiency of understanding for those of skill in the art, the invention will be described in detail in the context of a 3GPP system (UMTS, LTE, NR), the principles of the invention can be applied to other systems in which communication devices or User Equipment (UE) access a core network using a radio access technology.

In one example aspect, the present invention provides a method performed by a user equipment (UE), the method comprising: receiving information identifying a reference signal received power (RSRP) threshold value for transmitting a random access message comprising a preamble part and a Physical Uplink Shared Channel (PUSCH) transmission part; obtaining information identifying at least one respective offset associated with at least one priority level; and determining a type of random access procedure to be performed based on an RSRP measured by the UE, said RSRP threshold value, and a priority level associated with the UE.

In one example aspect, the present invention provides a method performed by a base station, the method comprising: broadcasting information identifying a reference signal received power (RSRP) threshold value for transmitting, by a user equipment (UE), a random access message comprising a preamble part and a Physical Uplink Shared Channel (PUSCH) transmission part; and carrying out a random access procedure with said UE based on an RSRP measured by the UE, said RSRP threshold value, and a priority level associated with the UE.

In one example aspect, the present invention provides a user equipment (UE) comprising: means for receiving information identifying a reference signal received power (RSRP) threshold value for transmitting a random access message comprising a preamble part and a Physical Uplink Shared Channel (PUSCH) transmission part; means for obtaining information identifying at least one respective offset associated with at least one priority level; and means for determining a type of random access procedure to be performed based on an RSRP measured by the UE, said RSRP threshold value, and a priority level associated with the UE.

In one example aspect, the present invention provides a base station comprising: means for broadcasting information identifying a reference signal received power (RSRP) threshold value for transmitting, by a user equipment (UE), a random access message comprising a preamble part and a Physical Uplink Shared Channel (PUSCH) transmission part; and means for carrying out a random access procedure with said UE based on an RSRP measured by the UE, said RSRP threshold value, and a priority level associated with the UE.

In another example aspect, the present invention provides a user equipment (UE) comprising a controller and a transceiver, wherein the controller is configured to: control the transceiver to receive information identifying a reference signal received power (RSRP) threshold value for transmitting a random access message comprising a preamble part and a Physical Uplink Shared Channel (PUSCH) transmission part; obtain information identifying at least one respective offset associated with at least one priority level; and determine a type of random access procedure to be performed based on an RSRP measured by the UE, said RSRP threshold value, and a priority level associated with the UE.

In yet another example aspect, the present invention provides a base station comprising a controller and a transceiver, wherein the controller is configured to: control the transceiver to broadcast information identifying a reference signal received power (RSRP) threshold value for transmitting, by a user equipment (UE), a random access message comprising a preamble part and a Physical Uplink Shared Channel (PUSCH) transmission part; and carry out a random access procedure with said UE based on an RSRP measured by the UE, said RSRP threshold value, and a priority level associated with the UE.

Example aspects of the invention extend to corresponding systems, apparatus, and computer program products such as computer readable storage media having instructions stored thereon which are operable to program a programmable processor to carry out a method as described in the example aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently of (or in combination with) any other disclosed and/or illustrated features. In particular but without limitation the features of any of the claims dependent from a particular independent claim may be introduced into that independent claim in any combination or individually.

BRIEF DESCRIPTION OF DRAWINGS

Example embodiments of the invention will now be described, by way of example, with reference to the accompanying drawings in which.

DESCRIPTION OF EMBODIMENTS

Overview

Figure 1:
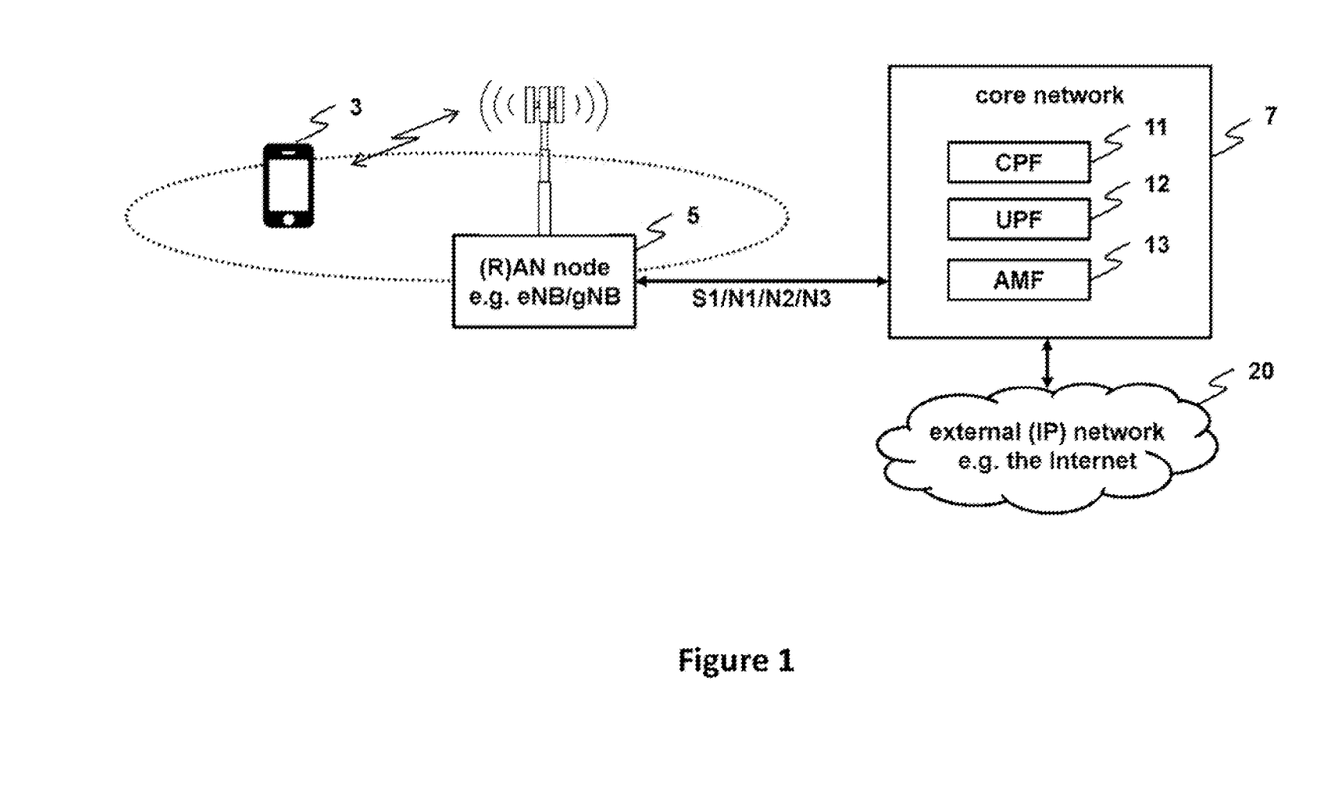
FIG. 1 illustrates schematically a mobile (cellular or wireless) telecommunication system to which example embodiments of the invention may be applied.

FIG. 1 schematically illustrates a mobile (cellular or wireless) telecommunication system 1 to which example embodiments of the present invention are applicable, In this network, users of mobile devices 3 (UEs) can communicate with each other and other users via respective base stations 5 and a core network 7 using an appropriate 3GPP radio access technology (RAT), for example, an E-UTRA and/or 5G RAT. It will be appreciated that a number of base stations 5 form a (radio) access network or (R)AN. As those skilled in the art will appreciate, whilst one mobile device 3 and one base station 5 are shown in FIG. 1 for illustration purposes, the system, when implemented, will typically include other base stations and mobile devices (UEs).

Each base station 5 controls one or more associated cells (either directly or via other nodes such as home base stations, relays, remote radio heads, distributed units, and/or the like), A base station 5 that supports E-UTRA/4G protocols may be referred to as an 'eNB' and a base station 5 that supports Next Generation/5G protocols may be referred to as a 'gNBs'. It will be appreciated that some base stations 5 may be configured to support both 4G and 5G, and/or any other 3GPP or non-3GPP communication protocols.

The mobile device 3 and its serving base station 5 are connected via an appropriate air interface (for example the so-called 'Uu' interface and/or the like). Neighbouring base stations 5 are connected to each other via an appropriate base station to base station interface (such as the so-called 'X2' interface, 'Xn' interface and/or the like). The base station 5 is also connected to the core network nodes via an appropriate interface (such as the so-called 'S1', 'N1', 'N2', 'N3' interface, and/or the like).

The core network 7 typically includes logical nodes (or 'functions') for supporting communication in the telecommunication system 1. Typically, for example, the core network 7 of a 'Next Generation'/5G system will include, amongst other functions, control plane functions (CPFs) 11 and user plane functions (UPFs) 12. It will be appreciated that the core network 7 may also include, amongst others, an Access and Mobility Management Function (AMF) 13. From the core network 7, connection to an external IP network 20 (such as the Internet) may also be provided.

The system supports both legacy (i.e. four-step) and two-step random access procedures. However, only those UEs 3 are allowed to use the two-step random access procedure that meet an associated RSRP threshold.

Beneficially, in this system, the effective RSRP threshold for using the two-step random access procedure is based on the priority level associated with the UE. Specifically, different offsets are applied to the default RSRP threshold (that is broadcast in SIB1) depending on the UE type and/or its usage type (i.e. UE priority level) thereby resulting in a different effective RSRP thresholds for different UE priority levels.

This may be realised by specifying appropriate random access parameters (e.g. a UE priority level based offset) based on UE type and/or usage type and communicating these parameters to the UE 3. In some cases, a default random access offset (per priority level) may be stored by the UE 3, e.g. for initial access purposes. In this case, the UE 3 can obtain the default offset from local memory even if the network has not yet provided an appropriate (e.g. cell specific) offset value.

Information identifying the UE priority level based offsets may be provided to the UE 3 either via broadcast (e.g. in SIB1) or via unicast (e.g. Radio Resource Control (RRC)). Alternatively, at least for some priority levels, the applicable offset may be pre-set or provided in an implicit manner, e.g. specified in the relevant 3GPP standards as a default value.

It will be appreciated that (information identifying) the specific offset for a UE priority level (or a list of offsets for respective UE priority levels) may be included in an appropriately formatted information element (e.g. 'MsgA-rsrp-ThresholdOffset' and/or the like).

For example, the 'msgA-rsrp-Threshold' IE of the 'RACH-ConfigCommon' IE may be adapted to specify the appropriate random access parameters in a given cell, including one or more priority level specific offset(s) for the RSRP threshold broadcast via the SIB1. In this case, the various priority level specific offsets are broadcast and each UE works out its own applicable offset based on its associated UE type and/or usage type.

Alternatively, (information identifying) the applicable RSRP threshold offset may be provided to a particular UE using dedicated signalling (e.g. RRC signalling). For example, the RRCSetup message may be configured to include an appropriate information element that specifies the applicable RSRP threshold offset for MsgA (e.g. an 'MsgA-rsrp-ThresholdOffset' IE and/or the like).

It will be appreciated that 4 to 8 priority levels may be used (in any case, at least two priority levels). For example, when four priority levels are used, the following different offset values may be configured:

Offset_0=−∞
(effectively, the UE can always attempt two-step random access using this offset)
Offset_1=−10 dB (for instance)
(in this case, the UE has a relatively higher chance to attempt two-step random access than without the offset)
Offset_2=0 dB (i.e. no offset, or a relatively low offset)
(the UE behaves normally and follows the default threshold broadcast in SIB1)
Offset_3=+∞
(effectively, the UE can never attempt two-step random access using this offset)

In a first option, SIB1 includes an appropriate information element to specify the applicable RSRP threshold offset for MsgA (e.g. 'MsgA-rsrp-ThresholdOffset' IE and/or the like). In a second option (which may be combined with the first option), the RRCSetup message includes an appropriate (optional) information element to specify the applicable RSRP threshold offset for MsgA (e.g. 'MsgA-rsrp-ThresholdOffset' IE and/or the like). It will be appreciated that this information element may also be introduced at a later stage e.g. in an 'RRCReconfiguration' message and/or the like.

Regardless which option is used, i.e. how the UE 3 obtains the applicable offset value (or offset values in case the UE can have different priority levels), the UE 3 stores the applicable offset value(s) for later use. When selecting which type of random access to initiate, the stored offset can be added to (summed with) the RSRP threshold for the given cell. In this case, for example, the effective offset is given by the sum of i) the threshold value indicated by the msgA-rsrp-Threshold parameter and ii) the offset value.

Beneficially, the network (base station 5) allows access to the two-step random access procedure to UEs depending on their priority level rather than UE location/RSRP threshold only. The two-step random access procedure can also be made available at the cell edge (and possibly for out-of-coverage UEs using an existing PUSCH power offset).

Mobile Device

Figure 2:
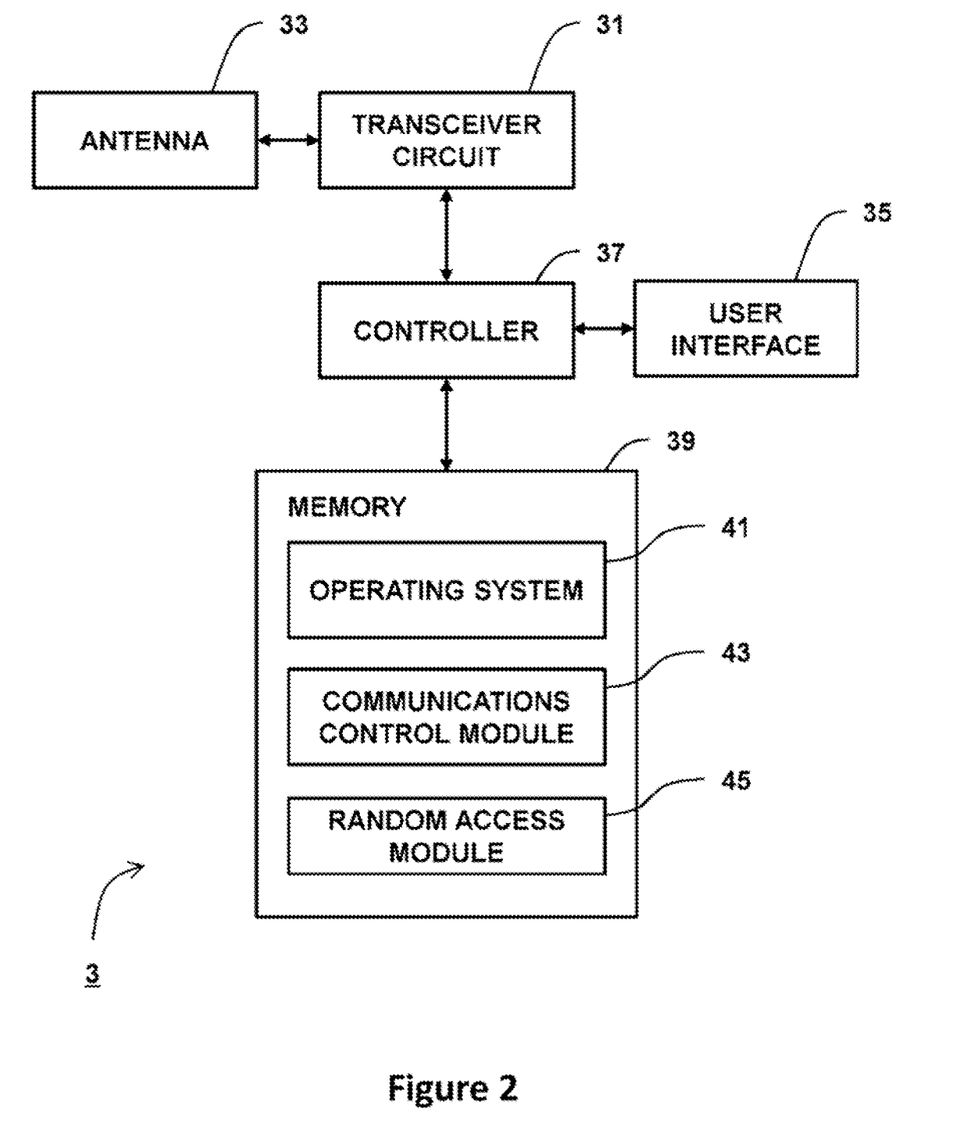
FIG. 2 is a block diagram of a User Equipment (UE) forming part of the system shown in FIG. 1.

FIG. 2 is a block diagram illustrating the main components of the mobile device 3 shown in FIG. 1 (e.g. a mobile telephone or an IoT device). As shown, the mobile device 3 has a transceiver circuit 31 that is operable to transmit signals to and to receive signals from a base station 5 via one or more antenna 33. The mobile device 3 has a controller 37 to control the operation of the mobile device 3. The controller 37 is associated with a memory 39 and is coupled to the transceiver circuit 31. Although not necessarily required for its operation, the mobile device 3 might of course have all the usual functionality of a conventional mobile telephone (such as a user interface 35) and this may be provided by any one or any combination of hardware, software and firmware, as appropriate. Software may be pre-installed in the memory 39 and/or may be downloaded via the telecommunications network or from a removable data storage device (RMD), for example.

The controller 37 is configured to control overall operation of the mobile device 3 by, in this example, program instructions or software instructions stored within memory 39. As shown, these software instructions include, among other things, an operating system 41, a communications control module 43, and a random access module 45.

The communications control module 43 is operable to control the communication between the mobile device 3 and its serving base station 5 (and other communication devices connected to the serving base station 5, such as other user equipment, core network nodes, etc.).

The random access module 45 is responsible for carrying out an appropriate random access procedure with the base station 5. The random access procedure may be either a 4-step random access procedure or a 2-step random access procedure, depending on, for example, a priority associated with the mobile device 3.

Although not shown in FIG. 2, the mobile device 3 will also typically include a paging module, an RRC module, and a NAS module.

The paging module is responsible for maintaining a (RAN based) paging area (e.g. in the form of a list of cells) in which the mobile device 3 can be paged, and to control the transceiver 31 to monitor for paging messages addressed to the mobile device 3. The paging module is also responsible for notifying other modules, e.g. the random access module 45, when the mobile device 3 is being paged by the network.

The RRC module is operable to generate, send and receive signalling messages formatted according to the RRC standard. For example, such messages are exchanged between the mobile device 3 and its serving base station 5. The RRC messages may include, for example, messages relating to performing a random access procedure (in dependence of a priority level associated with the mobile device 3). For example, the RRC messages may include information identifying one or more priority level specific offset for determining the type random access to perform.

The NAS module is operable to generate, send and receive signalling messages formatted according to the NAS standard. For example, such messages are exchanged between the mobile device 3 and the AMF 13 (via the serving base station 5, using the RRC module). The NAS messages may include, for example, messages relating to registering and/or updating a tracking area (or cell) where the mobile device 3 is currently located. The NAS messages may also include messages relating to a priority level associated with the mobile device 3.

Base Station

Figure 3:
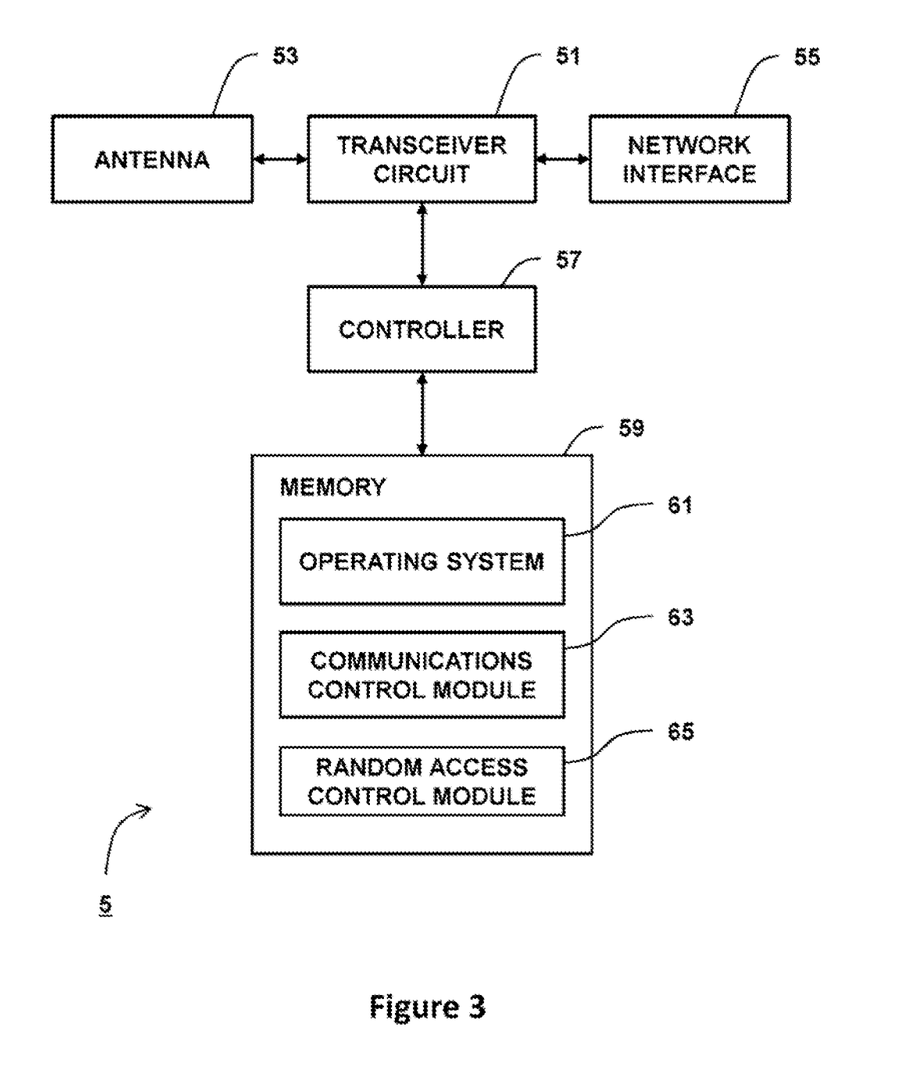
FIG. 3 is a block diagram of a base station forming part of the system shown in FIG. 1.

FIG. 3 is a block diagram illustrating the main components of a base station 5 shown in FIG. 1. As shown, the base station 5 has a transceiver circuit 51 for transmitting signals to and for receiving signals from user equipment (such as the mobile device 3) via one or more antenna 53, a core network interface 55 (e.g. an S1 interface, NG-C interface, and/or the like) for transmitting signals to and for receiving signals from the core network 7, and a base station interface 56 (e.g. an X2 interface, Xn interface, and/or the like) for transmitting signals to and for receiving signals from neighbouring base stations. The base station 5 has a controller 57 to control the operation of the base station 5 in accordance with software stored in a memory 59. The software may be pre-installed in the memory 59 and/or may be downloaded via the telecommunication network 1 or from a removable data storage device (RMD), for example. The software includes, among other things, an operating system 61, at least a communications control module 63, and a random access module 65.

The communications control module 63 is responsible for handling (generating/sending/receiving) signalling between the base station 5 and other nodes, such as the UE 3 and the core network nodes. Such signalling may include, for example, control data for managing operation of the mobile device 3 (e.g. NAS, RRC, paging, system information, and/or the like).

The random access module 65 is responsible for carrying out an appropriate random access procedure with the UEs 3 in its cell(s). The random access procedure may be either a 4-step random access procedure or a 2-step random access procedure, depending on, for example, a priority level associated with the UE 3.

Although not shown in FIG. 3, the base station 5 will also typically include an RRC module, a base station to base station interface module (e.g. X2/Xn module), and an appropriate core network interface module.

The RRC module is operable to generate, send and receive signalling messages formatted according to the RRC standard. For example, such messages are exchanged between the base station 5 and the mobile device 3 (and other user equipment within the cell of the base station 5). The RRC messages may include, for example, messages relating to a priority level associated with the UE and messages relating to performing a random access procedure (in dependence of the priority level). For example, the RRC messages may include information identifying one or more priority level specific offset for random access.

The base station to base station interface module is operable to generate, send and receive signalling messages (X2/Xn messages) formatted according to the X2AP (or XnAP) standard. The X2/Xn messages may include, for example, messages relating to paging a mobile device 3, handover, data forwarding, transferring/fetching of UE context (and other information relating to the mobile device 3) between neighbouring base stations. The X2/Xn messages may include, for example, messages relating to a priority level associated with the UE.

The core network interface module is operable to generate, send and receive signalling messages formatted according to the NG-C standard (or the S1AP standard in LTE). For example, such messages are exchanged between the base station 5 and the AMF 13 (or the MME in LTE). The NG-C(or S1AP) messages may include, for example, messages relating to a priority level associated with the UE.

Core Network Node

Figure 4:
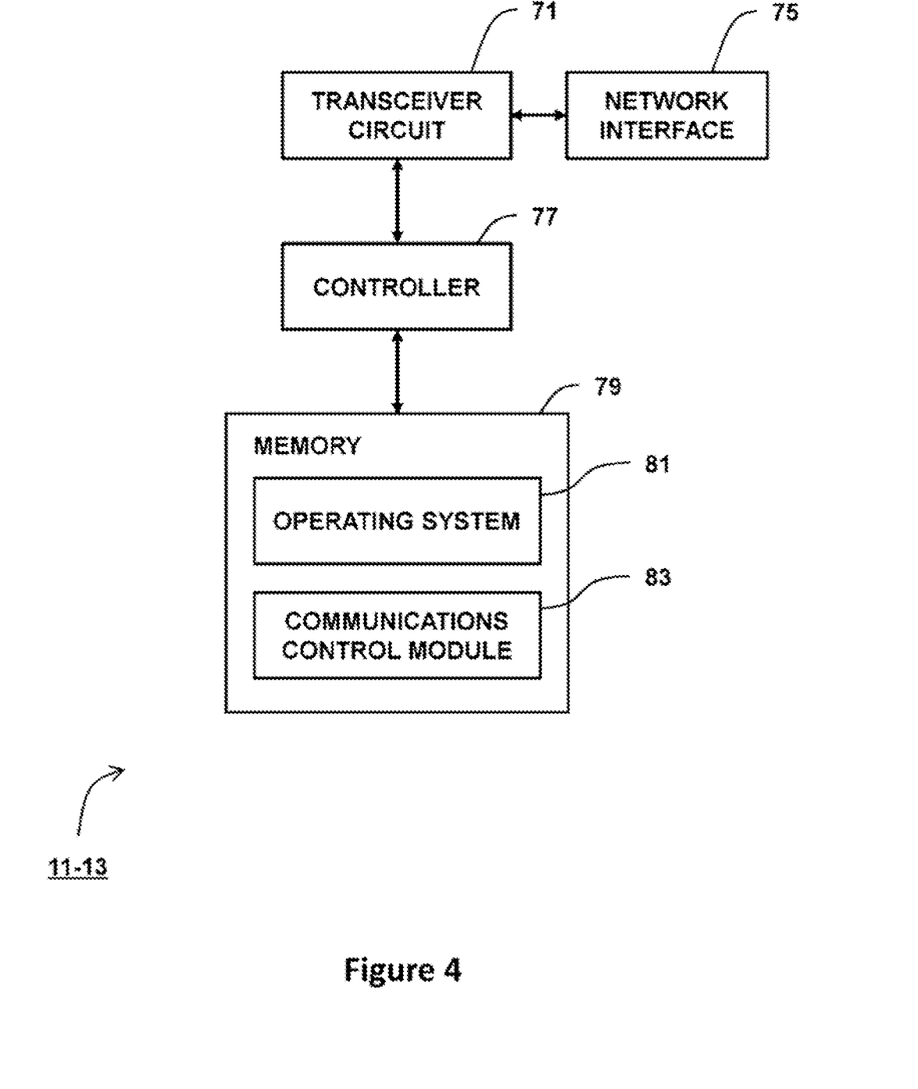
FIG. 4 is a block diagram of a core network node entity forming part of the system shown in FIG. 1.

FIG. 4 is a block diagram illustrating the main components of a generic core network node (or function) shown in FIG. 1, for example, the AMF 13. As shown, the core network node includes a transceiver circuit 71 which is operable to transmit signals to and to receive signals from other nodes (including the UE 3 and the (R)AN node 5) via a network interface 75. A controller 77 controls the operation of the core network node in accordance with software stored in a memory 79. The software may be pre-installed in the memory 79 and/or may be downloaded via the telecommunication network 1 or from a removable data storage device (RMD), for example. The software includes, among other things, an operating system 81 and at least a communications control module 83. The communications control module 83 is responsible for handling (generating/sending/receiving) signaling between the core network node and other nodes, such as the UE 3, the (R)AN node 5, and other core network nodes.

DETAILED DESCRIPTION

A more detailed description will now be given of some exemplary ways in which a UE can be mapped to an appropriate priority level. Effectively, by mapping different UEs to different priority levels, the access network (base station) is able to control the behaviour of the UEs in its cell, including whether a particular UE can use the two-step random access procedure or the four-step random access procedure (for a particular random access attempt).

3GPP provides multiple tools to categorise UEs (even before initial connection). For example, the following information may be used by the (access) network to determine which UEs to prioritise over other UEs:

3GPP Technical Specification (TS) 22.261 V16.10.0 specifies UE Access Identities and Categories.

For NR user-plane (NR-U), 3GPP defines Channel Access Priority Classes (CAPC) based on logical channel.

When (re-)establishing (or resuming) an RRC connection, the UE provides an appropriate RRC Establishment Cause to indicate the reason for requesting the RRC connection.

Clause 5.3.14 of 3GPP TS 38.331 V15.8.0 specifies the so-called Unified Access Control procedure. The purpose of this procedure is to perform access barring check for an access attempt associated with a given Access Category and one or more Access Identities upon request from upper layers (e.g. the RRC layer). In the Unified Access Control procedure, the 'UAC-BarringPerCatList' information element (IE) provides access control parameters for a list of access categories. Specifically, for each access category (as defined in 3GPP TS 22.261), the UAC-BarringPerCatList IE includes an entry ('UAC-BarringPerCat') defining the relevant access barring rules for that category.

The above information is known at the UE side before attempting random access. Beneficially, the UE 3 may be configured to derive an appropriate two-step random access priority level for that UE (and/or for that random access attempt) based on one or more of the above information. Thus, the UE may be configured to determine whether to initiate a two-step random access procedure (by sending MsgA) or a four-step random access procedure (by sending Msg1) based on at least one of the following: UE Access Identity, UE Access Category, CAPC, RRC Establishment Cause, and the applicable access barring rules.

Implementation Example 1: Overview

In this example, SIB1 includes an appropriate information element to specify the applicable RSRP threshold offset for MsgA (e.g. 'MsgA-rsrp-ThresholdOffset' IE and/or the like).

As explained above, the effective threshold for using the two-step random access procedure may be based on a UE specific priority level (depending on UE type and/or usage). By applying different offsets to the RSRP threshold broadcast in SIB1, different effective RSRP thresholds may be achieved for different UE priority levels.

This may be realised by specifying appropriate random access parameters based on UE type and/or usage type. For example, the 'rsrp-ThresholdSSB' IE of the 'RACH-ConfigCommon' IE may be adapted to specify the appropriate random access parameters in a given cell, including one or more priority level specific offset(s) for the RSRP threshold broadcast in SIB1.

TABLE 1

RACH-ConfigCommon information element

```
-- ASN1START
-- TAG-RACH-CONFIGCOMMON-START
RACH-ConfigCommon ::=                    SEQUENCE {
  rach-ConfigGeneric                     RACH-ConfigGeneric,
  totalNumberOfRA-Preambles              INTEGER (1..63)    OPTIONAL, -- Need S
  ssb-perRACH-OccasionAndCB-PreamblesPerSSB       CHOICE {
    oneEighth
       ENUMERATED {n4,n8,n12,n16,n20,n24,n28,n32,n36,n40,n44,n48,n52,n58,n60,n64},
    oneFourth
         ENUMERATED {n4,n8,n12,n16,n20,n24,n28,n32,n36,n40,n44,n48,n52,n58,n60,n64},
    oneHalf
         ENUMERATED {n4,n8,n12,n16,n20,n24,n28,n32,n36,n40,n44,n48,n52,n58,n60,n64},
    one      ENUMERATED {n4,n8,n12,n16,n20,n24,n28,n32,n36,n40,n44,n48,n52,n58,n60,n64},
    two      ENUMERATED {n4,n8,n12,n16,n20,n24,n28,n32},
    four        INTEGER (1..16),
    eight       INTEGER (1..8),
    sixteen     INTEGER (1..4)
}                           OPTIONAL, -- Need M
groupBconfigured                         SEQUENCE {
  re-Meg3SizeGroupA                      ENUMERATED {b56, b144, b208, b256, b282, b480,
                                         b640,
                                         b800, b1000, b72, spare6, spare5,spare4, spare3.
                                         spare2, spare1}
  messagePowerOffsetGroupB                 ENUMERATED {minusinfinity dB0, d35, dB8, dB10,
                                         dB12, dB15, dB18}.
  numberOfRA-PreamblesGroupA               INTEGER (1..64)
}                                       OPTIONAL, -- Need R
rc-ContentionResolutionTimer             ENUMERATED { sf8, sf16, sf24, sf32, sf40, sf45, sf56,
                                         sf64}.
rsrp-ThresholdSSB                        RSRP Range       OPTIONAL, -- Need R
rsrp-ThresholdSSB-SUL                     RSRP Range       OPTIONAL, -- Cond SUL
prach-RootSequenceIndex                   CHOCE {
  |839                                    INTEGER (0..837),
  |139                                    INTEGER (0..137)
},
msg1-SubcarrierSpacing                   SubcarrierSpacing   OPTIONAL, -- Cond L139
restrictedSetConfig                       ENUMERATED {unrestrictedSet, restrictedSetTypeA,
restrictedSetTypeB},
 msg3-transformPrecoder                  ENUMERATED {enabled} OPTIONAL, -- Need R
 ...
}
  msgA-rsrp-Threshold*
  msgA-rsrp-Threshold-SUL*
  msgA-rsrp-ThresholdOffset*
-- TAG-RACH-CONFIGCOMMON-STOP
-- ASN1STOP
```

*may be provided on a per priority level basis (e.g. as a list)

Implementation Example 1: Mapping by User Access Identity

The UE specific priority level and the corresponding RSRP offset may be derived based on the UE Access Identity associated with the UE (possibly in combination with other information). Table 2 provides an overview of the UE Access identities defined in Clause 6.22.2.2 of 3GPP TS 22.261 V16.10.0. In summary, a UE Access identity comprises 4 bits, it describes the type of UE, and it is hardcoded in the SIM. As can be seen, identities 3-10 are reserved for future use.

TABLE 2

UE Access identities

| Access Identity | UE configuration |
| --- | --- |
| 0 | UE is not configured with any parameters from this table |
| 1 (NOTE 1) | UE is configured for Multimedia Priority Service (MPS). |
| 2 (NOTE 2) | UE is configured for Mission Critical Service (MCS). |
| 3-10 | Reserved for future use |
| 11 (NOTE 3) | Access Class 11 is configured in the UE. |
| 12 (NOTE 3) | Access Class 12 is configured in the UE. |
| 13 (NOTE 3) | Access Class 13 is configured in the UE. |
| 14 (NOTE 3) | Access Class 14 is configured in the UE. |
| 15 (NOTE 3) | Access Class 15 is configured in the UE. |

NOTE 1:
Access Identity 1 is used by UEs configured for MPS, in the PLMNs where the configuration is valid. The PLMNs where the configuration is valid are HPLMN, PLMNs equivalent to HPLMN, and visited PLMNs of the home country. Access Identity 1 is also valid when the UE is explicitly authorized by the network based on specific configured PLMNs inside and outside the home country.
NOTE 2:
Access Identity 2 is used by UEs configured for MCS, in the PLMNs where the configuration is valid. The PLMNs where the configuration is valid are HPLMN or PLMNs equivalent to HPLMN and visited PLMNs of the home country. Access Identify 2 is also valid when the UE is explicitly authorized by the network based on specific configured PLMNs inside and outside the home country.
NOTE 3.
Access Identities 11 and 15 are valid in Home PLMN only if the EHPLMN list is not present or in any EHPLMN. Access Identities 12, 13 and 14 are valid in Home PLMN and visited PLMNs of home country only. For this purpose, the home country is defined as the country of the MCC part of the IMSI.

Implementation Example 1: Mapping by User Access Category

The UE specific priority level and the corresponding RSRP offset may be derived based on the UE Access Category associated with the UE (possibly in combination with other information). Table 3 provides an overview of the UE Access categories defined in Clause 6.22.2.3 of 3GPP TS 22.261 V16.10.0. In summary, a UE Access category comprises 6 bits, it determines how the UE will access the network, changes according to the use case (e.g. emergency) and the access identity. As can be seen, categories 32-63 are based on operator classification.

Access Categories and can be used to map different levels of priority. The currently specified establishment cause values are as follows: emergency, highPriorityAccess, mt-Access, mo-Signalling, mo-Data, mo-VoiceCall, mo-VideoCall, mo-SMS, mps-PriorityAccess, mcs-PnorityAccess, spare6, spare5, spare4, spare3, spare2, and spare1. The UE 3 is configured to include an appropriate establishment cause when it sends an RRCSetupRequest message to the base station 5.

In order to ensure that relatively high priority communications (e.g. emergency, highPriorityAccess, mps-PriorityAccess, and mcs-PriorityAccess) are able to use the two-step

TABLE 3

| UE Access categories | | |
|---|---|---|
| Access Category | Conditions related to UE | Type of access attempt |
| 0 | All | MO signalling resulting from paging |
| 1 (NOTE 1) | UE is configured for delay tolerant service and subject to access control for Access Category 1, which is judged based on relation of UE's HPLMN and the selected PLMN. | All except for Emergency, or MO exception data |
| 2 | All | Emergency |
| 3 | All except for the conditions in Access Category 1. | MO signalling on NAS level resulting from other than paging |
| 4 | All except for the conditions in Access Category 1. | MMTEL voice (NOTE 3) |
| 5 | All except for the conditions in Access Category 1. | MMTEL video |
| 6 | All except for the conditions in Access Category 1. | SMS |
| 7 | All except for the conditions in Access Category 1. | MO data that do not belong to any other Access Categories (NOTE 4) |
| 8 | All except for the conditions in Access Category 1 | MO signalling on RRC level resulting from other than paging |
| 9 | All except for the conditions in Access Category 1 | MO IMS registration related signalling (NOTE 5) |
| 10 (NOTE 8) | All | MO exception data |
| 11-31 | | Reserved standardized Access Categories |
| 32-63 (NOTE 2) | All | Based on operator classification |

NOTE 1:
The barring parameter for Access Category 1 is accompanied with information that define whether Access Category applies to UEs within one of the following categories:
a) UEs that are configured for delay tolerant service.
b) UEs that are configured for delay tolerant service and are neither in their HPLMN nor in a PLMN that is equivalent to it.
c) UEs that are configured for delay tolerant service and are neither in the PLMN listed as most preferred PLMN of the country where the UE is roaming in the operator defined PLMN selector list on the SIM/USIM, nor in their HPLMN nor in a PLMN that is equivalent to their HPLMN.
When a UE is configured for EAB, the UE is also configured for delay tolerant service. In case a UE is configured both for EAB and for EAB override, when upper layer indicates to override Access Category 1, then Access Category 1 is not applicable.
NOTE 2:
When there are an Access Category based on operator classification and a standardized Access Category to both of which an access attempt can be categorized, and the standardized Access Category is neither 0 nor 2, the UE applies the Access Category based on operator classification. When there are an Access Category based on operator classification and a standardized Access Category to both of which an access attempt can be categorized, and the standardized Access Category is 0 or 2, the UE applies the standardized Access Category.
NOTE 3:
Includes Real-Time Text (RTT).
NOTE 4:
Includes IMS Messaging.
NOTE 5:
Includes IMS registration related signalling, e.g. IMS initial registration, re-registration, and subscription refresh.
NOTE 6:
Applies to an NB-IcT UE, using NB-IOT connectivity to 5GC.

Implementation Example 1: Mapping by RRC Establishment Cause

The UE specific priority level and the corresponding RSRP offset may also be derived based on the RRC establishment cause associated with the UE (and/or other information). 3GPP TS 38.331 V15.8.0 specifies different RRC establishment causes, which are directly linked to UE random access procedure whenever possible, and hence benefit from lower latency than legacy random access, these communications may be assigned to relatively higher priority levels and use the associated RSRP threshold offset when selecting which type of random access procedure to perform (i.e. whether to transmit Msg1 or MsgA). On the other hand, relatively low priority communications (e.g.

mt-Access, mo-Signalling, mo-Data, mo-VoiceCall, mo-VideoCall, and mo-SMS) may be assigned to relatively lower priority levels and use the associated RSRP threshold offset when selecting the type of random access procedure.

Implementation Example 2: Mapping via RRC information element In this example (which may be combined with the above described first implementation example), the RRCSetup message includes an appropriate information element which specifies the applicable RSRP threshold offset for MsgA (e.g. an 'MsgA-rsrp-ThresholdOffset' IE and/or the like). For example, the MsgA-rsrp-ThresholdOffset IE may be included in the RRCSetup message as follows:

TABLE 4

| RRCSetup message |
|---|
| -- ASN1START |
| -- TAG-RRCSETUP-START |
| RRCSetup ::=                SEQUENCE { |
|   noTransactionIdentifier        RRC TransactionIdentifier |
|   criticalExtensions             CHOICE { |
|     rrcSetup                     RRCSetup-IEs |
|     criticalExtensionsFuture     SEQUENCE { } |
|   } |
| } |
| RRCSetup-IEs ::=            SEQUENCE { |
|   RadioBearerConfig             RadioBearerConfig |
|   masterCellGroup               OCTET STRING {CONTAINING CellGroupConfig}, |
|   lateNonCriticalExtension      OCTET STRING     OPTIONAL, |
|   nonCriticalExtension          SEQUENCE{ }      OPTIONAL |
|   MsgA-rsrp-ThresholdOffset  ...                 OPTIONAL |
| } |
| -- TAG-RRCSETUP-STOP |
| -- ASN1STOP |

It will be appreciated that this information element (or a similar one) may also be introduced at a later stage e.g. in an 'RRCReconfiguration' message and/or the like, for example when the threshold needs to be updated In summary, UEs may be categorised into associated priority levels depending on at least one of static information (e.g. UE Access Identity/UE Access Category) and dynamic information (e.g. RRC establishment cause or network broadcast information).

Since each criterion has limitations and there are many values for each, it will be appreciated that a limited set of priority levels are used. This can be configured (and reconfigured) by the network, as appropriate.

Operation

Figure 5:
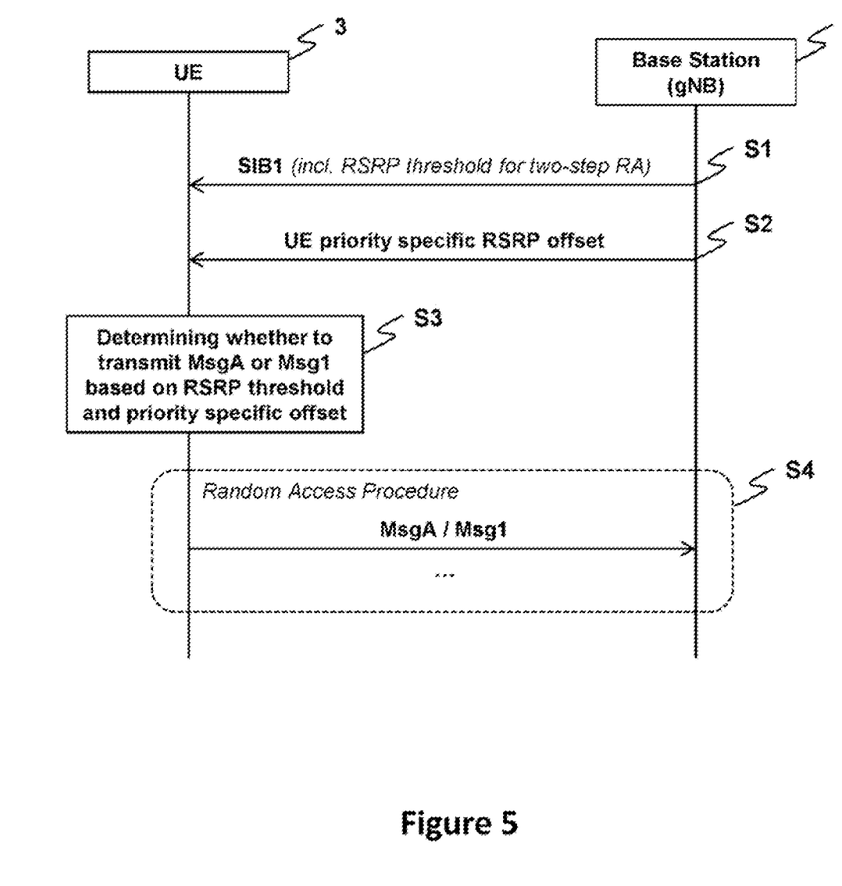
FIG. 5 is a timing diagram of an exemplary way in which a priority level based random access procedure may be performed in the system of FIG. 1.

FIG. 5 is a timing diagram of an exemplary way in which a priority level based random access procedure may be performed in the system of FIG. 1.

As can be seen, the base station 5 is configured to transmit (broadcast), in step S1, an appropriately formatted SIB1 which includes the RSRP threshold for two-step random access in the cell of the base station 5. Specifically, the SIB1 includes an appropriate information element that signals the applicable RSRP threshold for MsgA I two-step random access. In one example, the information element comprises an 'MsgA-rsrp-Threshold' information element or similar. It will be appreciated that different cells may have different associated RSRP thresholds and the applicable RSRP threshold is indicated via the SIB1 in each cell.

In step S2, the base station 5 transmits (either via broadcast or dedicated message), information identifying an RSRP offset for at least one UE priority level, to be applied by the UE 3 when determining whether to attempt a two-step random access procedure (or fall back to the legacy, four-step random access procedure) for that specific UE priority level.

It will be appreciated that the information identifying an RSRP offset (or a set of RSRP offsets) may form part of the SIB1 message, e.g. an appropriate information element thereof, in which case steps S1 and S2 can be combined (in accordance with the above described implementation example 1). However, when the RSRP offset is provided in a separate message (e.g. in a dedicated message), steps S1 and S2 are performed separately, since they involve different messages (step S2 corresponding to implementation example 2). In this case, it will also be appreciated that the RSRP offset may be provided to the UE 3 before the RSRP threshold in SIB1, if appropriate, i.e. step S2 may precede step S1.

If the RSRP offset is signalled via the SIB1 (in step S1), the SIB1 includes an appropriate information element that specifies, for at least one priority level, the applicable RSRP threshold offset for MsgA for that priority level (e.g. 'MsgA-rsrp-ThresholdOffset' or similar). If the RSRP offset is signalled in step S2 via a dedicated message (e.g. an RRC message), the RSRP offset is included in an appropriate information element of the dedicated message (e.g. in 'MsgA-rsrp-ThresholdOffset' IE or similar). It will be appreciated that if the UE 3 receives more than one offset ('MsgA-rsrp-ThresholdOffset' information element) for a given UE priority level, it uses the last received value. This allows the network to perform load balancing by updating the offset(s) and provide the updated offset(s) to the relevant UEs without unnecessary delay.

The UE 3 stores the received RSRP threshold and any RSRP offset in its memory 39 for subsequent random access procedures.

In step S3, the UE 3 determines (using its random access module 45) that it needs to establish a connection with the network requiring the UE 3 to perform a random access procedure. It will be appreciated that this step may be triggered by a paging message from the network or by an indication from higher layers that the UE 3 has data to transmit. As part of this step, the UE 3 also determines whether it is allowed attempt a two-step random access procedure based on RSRP threshold and the applicable UE priority specific offset. In other words, the UE 3 determines whether to transmit MsgA or Msg1 to the base station 5.

It will be appreciated that the UE priority specific offset may be applicable to all communications by the UE 3

(irrespective of the type of service that triggered the random access procedure). Alternatively, the UE 3 may be configured to apply a different RSRP offset for different services or different communication categories, in which case the determination in step S3 also takes into account the service or usage type that triggered the random access procedure (and the UE 3 applies the relevant offset based on the service or usage type).

In step S4, depending on the result of the determination in step S3, the UE 3 initiates a random access procedure by generating and sending an appropriately formatted Msg1 message (in case it is determined in step S3 that the RSRP measured by the UE 3 is below the sum of the applicable RSRP threshold value and the relevant offset) or an appropriately formatted MsgA message (in case it is determined in step S3 that the RSRP measured by the UE 3 meets or exceeds the sum of the applicable RSRP threshold value and the relevant offset).

The rest of the random access procedure is omitted for sake of simplicity.

Beneficially, the UE 3 is able to use the two-step random access procedure depending on its priority level rather than UE location/RSRP threshold only. The UE 3 is also able to use the two-step random access procedure at cell edge (at least for relatively high priority communications or usage types).

Modifications and Alternatives

Detailed example embodiments have been described above. As those skilled in the art will appreciate, a number of modifications and alternatives can be made to the above example embodiments whilst still benefiting from the inventions embodied therein. By way of illustration only a number of these alternatives and modifications will now be described.

It will be appreciated that the UE priority specific RSRP offset value can either be fixed (preset), broadcast (via SIB1), or unicast (via dedicated signalling). It will also be appreciated that a default value may be used for initial access (in which case there is no need to broadcast the RSRP offset value via the SIB1). In this case, each RRC connection procedure for the UE (e.g. RRC establishment, RRC resume, RRC reconfiguration) may be adapted to carry an optional RSRP offset field to update the default value.

In the above description, the two-step random access procedure and the four-step random access procedure are described as separate procedures. However, it will be appreciated that after sending MsgA of the two-step random access procedure, the UE may switch to the four-step random access procedure (e.g. when instructed by the network or when there is a collision). Specifically, after the UE transmits MsgA, it waits for the MsgB response from the base station. As described earlier, MsgB comprises a random access response and a contention resolution message. However, there are three possible outcomes:

If the base station doesn't detect the MsgA PRACH preamble, no response is sent to the UE. In this case the UE may be configured to retransmit MsgA and/or fall back to the four-step RACH (i.e. transmit Msg1). The number of MsgA retransmissions allowed in a cell may be limited by an appropriate parameter (e.g. a counter and/or the like).

If the base station detects the MsgA preamble but fails to successful decode the MsgA PUSCH, the base station sends an appropriately formatted RAR ('fallbackRAR') to the UE with a random-access preamble identifier (RAPID) and an uplink grant for retransmitting the PUSCH part of the previously sent MsgA. Upon receiving the fallbackRAR, the UE falls back to the four-step random access procedure and transmits Msg3 (retransmission of the MsgA PUSCH).

If the base station detects MsgA and successfully decodes MsgA PUSCH, the base station sends an appropriately formatted RAR ('successRAR') to the UE with the contention resolution identifier of MsgA. The reception of the successRAR successfully completes the two-step random access procedure.

In the above description, the UE, the (R)AN node, and the core network node are described for ease of understanding as having a number of discrete modules (such as the communication control modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

In the above example embodiments, a number of software modules were described. As those skilled in the art will appreciate, the software modules may be provided in compiled or un-compiled form and may be supplied to the UE, the (R)AN node, and the core network node as a signal over a computer network, or on a recording medium. Further, the functionality performed by part or all of this software may be performed using one or more dedicated hardware circuits. However, the use of software modules is preferred as it facilitates the updating of the UE, the (R)AN node, and the core network node in order to update their functionalities.

In the current 5G architecture, the gNB internal structure may be split into two parts known as the Central Unit (CU) and the Distributed Unit (DU), connected by an F1 interface. It will be appreciated that a CU may be connected to (and control) a plurality of DUs. This enables the use of a 'split' architecture, whereby the, typically 'higher', CU layers (for example, but not necessarily or exclusively), PDCP) and the, typically 'lower', DU layers (for example, but not necessarily or exclusively, RLC/MAC/PHY) to be implemented separately. Thus, for example, the higher layer CU functionality for a number of gNBs may be implemented centrally (for example, by a single processing unit, or in a cloud-based or virtualised system), whilst retaining the lower layer DU functionality locally, in each gNB. It will be appreciated that a CU may perform communication with the next generation core and the DU may perform communication over an air interface with UEs in the vicinity (i.e. in a cell operated by the gNB).

In more detail, a distributed gNB includes the following functional units:

gNB Central Unit (gNB-CU): a logical node hosting Radio Resource Control (RRC), Service Data Adaptation Protocol (SDAP) and Packet Data Convergence Protocol (PDCP) layers of the gNB or RRC and PDCP layers of the En-gNB that controls the operation of one or more gNB-DUs. The gNB-CU terminates the F1 interface connected with the gNB-DU.

gNB Distributed Unit (gNB-DU): a logical node hosting Radio Link Control (RLC), Medium Access Control (MAC) and Physical (PHY) layers of the gNB or En-gNB, and its operation is partly controlled by gNB-CU. One gNB-DU supports one or multiple cells. One cell is supported by only one gNB-DU. The gNB-DU terminates the F1 interface connected with the gNB-CU.

gNB-CU-Control Plane (gNB-CU-CP): a logical node hosting the RRC and the control plane part of the PDCP protocol of the gNB-CU for an En-gNB or a gNB. The gNB-CU-CP terminates the E1 interface connected with the gNB-CU-UP and the F1-C interface connected with the gNB-DU.

gNB-CU-User Plane (gNB-CU-UP): a logical node hosting the user plane part of the PDCP protocol of the gNB-CU for an En-gNB, and the user plane part of the PDCP protocol and the SDAP protocol of the gNB-CU for a gNB. The gNB-CU-UP terminates the E1 interface connected with the gNB-CU-CP and the F1-U interface connected with the gNB-DU.

The User Equipment (or "UE") in the present disclosure is an entity connected to a network via a wireless interface. The UE may also be referred to as "mobile station", "mobile device", "wireless device", or "wireless transmit/receive unit" (WTRU).

It should be noted that the present disclosure is not limited to a dedicated communication device, and can be applied to any device having a communication function as explained in the following paragraphs.

The terms "User Equipment" or "UE" (as the term is used by 3GPP), "mobile station", "mobile device", and "wireless device" are generally intended to be synonymous with one another, and include standalone mobile stations, such as terminals, cell phones, smart phones, tablets, cellular IoT devices, IoT devices, and machinery. It will be appreciated that the terms "mobile station" and "mobile device" also encompass devices that remain stationary for a long period of time.

A UE may, for example, be an item of equipment for production or manufacture and/or an item of energy related machinery (for example equipment or machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; molds or dies; rolls; conveying equipment; elevating equipment; materials handling equipment; textile machinery; sewing machines; printing and/or related machinery; paper converting machinery; chemical machinery; mining and/or construction machinery and/or related equipment; machinery and/or implements for agriculture, forestry and/or fisheries; safety and/or environment preservation equipment; tractors; precision bearings; chains; gears; power transmission equipment; lubricating equipment; valves; pipe fittings; and/or application systems for any of the previously mentioned equipment or machinery etc.).

A UE may, for example, be an item of transport equipment (for example transport equipment such as: rolling stocks; motor vehicles; motor cycles; bicycles; trains; buses; carts; rickshaws; ships and other watercraft; aircraft; rockets; satellites; drones; balloons etc.).

A UE may, for example, be an item of information and communication equipment (for example information and communication equipment such as: electronic computer and related equipment; communication and related equipment; electronic components etc.).

A UE may, for example, be a refrigerating machine, a refrigerating machine applied product, an item of trade and/or service industry equipment, a vending machine, an automatic service machine, an office machine or equipment, a consumer electronic and electronic appliance (for example a consumer electronic appliance such as: audio equipment; video equipment; a loud speaker; a radio; a television; a microwave oven; a rice cooker; a coffee machine; a dishwasher; a washing machine; a dryer; an electronic fan or related appliance; a cleaner etc.).

A UE may, for example, be an electrical application system or equipment (for example an electrical application system or equipment such as: an x-ray system; a particle accelerator; radio isotope equipment; sonic equipment; electromagnetic application equipment; electronic power application equipment etc.).

A UE may, for example, be an electronic lamp, a luminaire, a measuring instrument, an analyzer, a tester, or a surveying or sensing instrument (for example a surveying or sensing instrument such as: a smoke alarm; a human alarm sensor; a motion sensor; a wireless tag etc.), a watch or clock, a laboratory instrument, optical apparatus, medical equipment and/or system, a weapon, an item of cutlery, a hand tool, or the like.

A UE may, for example, be a wireless-equipped personal digital assistant or related equipment (such as a wireless card or module designed for attachment to or for insertion into another electronic device (for example a personal computer, electrical measuring machine)).

A UE may be a device or a part of a system that provides applications, services, and solutions described below, as to 'internet of things' (IoT), using a variety of wired and/or wireless communication technologies.

Internet of Things devices (or "things") may be equipped with appropriate electronics, software, sensors, network connectivity, and/or the like, which enable these devices to collect and exchange data with each other and with other communication devices. IoT devices may comprise automated equipment that follow software instructions stored in an internal memory. IoT devices may operate without requiring human supervision or interaction. IoT devices might also remain stationary and/or inactive for a long period of time. IoT devices may be implemented as a part of a (generally) stationary apparatus. IoT devices may also be embedded in non-stationary apparatus (e.g. vehicles) or attached to animals or persons to be monitored/tracked.

It will be appreciated that IoT technology can be implemented on any communication devices that can connect to a communications network for sending/receiving data, regardless of whether such communication devices are controlled by human input or software instructions stored in memory.

It will be appreciated that IoT devices are sometimes also referred to as Machine-Type Communication (MTC) devices or Machine-to-Machine (M2M) communication devices. It will be appreciated that a UE may support one or more IoT or MTC applications. Some examples of MTC applications are listed in the following table (source: 3GPP TS 22.368 V13.1.0, Annex B, the contents of which are incorporated herein by reference). This list is not exhaustive and is intended to be indicative of some exam les of machine type communication applications.

TABLE 5

| Service Area | MTC applicatons |
|---|---|
| Security | Surveillance systems |
| | Backup tor landline |
| | Control of physical access |
| | (e.g. to buildings) |
| | Car/driver security |
| Tracking & Tracing | Fleet Management |
| | Order Management |
| | Pay as you drive |
| | Asset Tracking |
| | Navigation |
| | Traffic information |
| | Road tolling |
| | Road traffic optimisation/steering |
| Payment | Point of sales |
| | Vending machines |
| | Gaming machines |
| Health | Monitoring vital signs |
| | Supporting the aged or handicapped |
| | Web Access Telemedicine points |
| | Remote diagnostics |
| Remote | Sensors |
| Maintenance/Control | Lighting |
| | Pumps |
| | Valves |
| | Elevator control |
| | Vending machine control |
| | Vehicle diagnostics |
| Metering | Power |
| | Gas |
| | Water |
| | Heating |
| | Grid control |
| | Industrial metering |
| Consumer Devices | Digital photo frame |
| | Digital camera |
| | eBook |

Applications, services, and solutions may be an Mobile Virtual Network Operator (MVNO) service, an emergency radio communication system, a Private Branch eXchange (PBX) system, a PHS/Digital Cordless Telecommunications system, a Point of sale (POS) system, an advertise calling system, a Multimedia Broadcast and Multicast Service (MBMS), a Vehicle to Everything (V2X) system, a train radio system, a location related service, a Disaster/Emergency Wireless Communication Service, a community service, a video streaming service, a femto cell application service, a Voice over LTE (VoLTE) service, a charging service, a radio on demand service, a roaming service, an activity monitoring service, a telecom carrier/communication NW selection service, a functional restriction service, a Proof of Concept (PoC) service, a personal information management service, an ad-hoc network/Delay Tolerant Networking (DTN) service, etc.

Further, the above-described UE categories are merely examples of applications of the technical ideas and exemplary example embodiments described in the present document. Needless to say, these technical ideas and example embodiments are not limited to the above-described UE and various modifications can be made thereto.

The method performed by the UE may further comprise determining a priority level for a connection attempt; and transmitting a first random access message (Msg1/MsgA) for a connection based on said RSRP measured by the UE, said RSRP threshold value, and the offset associated with the priority level for said connection attempt.

The method performed by the UE may further comprise generating and transmitting a first random access message (MsgA) comprising a preamble part and a PUSCH transmission part when said RSRP measured by the UE is equal to or larger than a sum of said threshold value and the offset associated with the priority level associated with the UE.

The method performed by the UE may further comprise generating and transmitting a first random access message (Msg1) comprising a preamble part but no PUSCH transmission part when said RSRP measured by the UE is lower than a sum of said threshold value and the offset associated with the priority level associated with the UE.

The method performed by the UE may further comprise generating and transmitting a third random access message (Msg3) comprising a PUSCH transmission part in response to receiving a second random access message (Msg2) from the network.

The method performed by the UE may comprise obtaining said information identifying at least one respective offset associated with at least one priority level by receiving an information element identifying, for each priority level, a corresponding offset. In this case, the information element may be included in at least one of a system information message (e.g. SIB1) and a dedicated message (e.g. a Radio Resource Control message). The information element may comprise at least one 'MsgA-rsrp-ThresholdOffset' information element.

The method performed by the base station may further comprise transmitting, to the UE, information identifying at least one respective offset associated with at least one priority level.

The method performed by the base station may further comprise receiving, from said UE, a first random access message (Msg1/MsgA) based on said RSRP measured by the UE, said RSRP threshold value, and an offset associated with a priority level for a connection attempt by the UE.

The priority level may be based on at least one of: a UE Access Identity associated with the UE, a UE Access Category associated with the UE: a Channel Access Priority Class (CAPC) associated with the UE; an RRC establishment cause associated with the UE; and an Access Barring rule associated with the UE.

The at least one respective offset associated with at least one priority level may comprise at least one of: an offset that, when applied to said threshold value, results in a relatively high chance for transmitting a random access message comprising a preamble part and a Physical Uplink Shared Channel (PUSCH) transmission part; an offset that, when applied to said threshold value, results in a relatively low chance for transmitting a random access message comprising a preamble part and a Physical Uplink Shared Channel (PUSCH) transmission part; an offset that, when applied to said threshold value, allows the UE to transmit a random access message comprising a preamble part and a Physical Uplink Shared Channel (PUSCH) transmission part irrespective of the RSRP measured by the UE; and an offset that, when applied to said threshold value, prevents the UE from transmitting a random access message comprising a preamble part and a Physical Uplink Shared Channel (PUSCH) transmission part.

Various other modifications will be apparent to those skilled in the art and will not be described in further detail here.

(Supplementary Note 1)

A method performed by a user equipment (UE), the method comprising:

receiving information identifying a reference signal received power (RSRP) threshold value for transmitting a random access message comprising a preamble part and a Physical Uplink Shared Channel (PUSCH) transmission part; obtaining information identifying at least one respective offset associated with at least one priority level; and determining a type of random access procedure to be performed based on an RSRP measured by the UE, said RSRP threshold value, and a priority level associated with the UE.

(Supplementary Note 2)

The method according to supplementary note 1, further comprising:

determining a priority level for a connection attempt; and transmitting a first random access message (Msg1/MsgA) for a connection based on said RSRP measured by the UE, said RSRP threshold value, and the offset associated with the priority level for said connection attempt.

(Supplementary Note 3)

The method according to supplementary note 1 or 2, further comprising:

generating and transmitting a first random access message (MsgA) comprising a preamble part and a PUSCH transmission part when said RSRP measured by the UE is equal to or larger than a sum of said threshold value and the offset associated with the priority level associated with the UE.

(Supplementary Note 4)

The method according to supplementary note 1 or 2, further comprising:

generating and transmitting a first random access message (Msg1) comprising a preamble part but no PUSCH transmission part when said RSRP measured by the UE is lower than a sum of said threshold value and the offset associated with the priority level associated with the UE.

(Supplementary Note 5)

The method according to any of supplementary notes 1 to 4, further comprising:

generating and transmitting a third random access message (Msg3) comprising a PUSCH transmission part in response to receiving a second random access message (Msg2) from the network.

(Supplementary Note 6)

The method according to any of supplementary notes 1 to 5, comprising obtaining said information identifying at least one respective offset associated with at least one priority level by receiving an information element identifying, for each priority level, a corresponding offset.

(Supplementary Note 7)

The method according to supplementary note 6, wherein said information element is included in at least one of a system information message (e.g. SIB1) and a dedicated message (e.g. a Radio Resource Control message).

(Supplementary Note 8)

The method according to supplementary note 6 or 7, wherein said information element comprises at least one 'MsgA-rsrp-ThresholdOffset' information element, (Supplementary Note 9)

The method according to any of supplementary notes 1 to 8, wherein said priority level is based on at least one of: a UE Access Identity associated with the UE, a UE Access Category associated with the UE; a Channel Access Priority Class (CAPC) associated with the UE; an RRC establishment cause associated with the UE; and an Access Barring rule associated with the UE.

(Supplementary Note 10)

The method according to any of supplementary notes 1 to 9, wherein said at least one respective offset associated with at least one priority level comprises at least one of:

an offset that, when applied to said threshold value, results in a relatively high chance for transmitting a random access message comprising a preamble part and a Physical Uplink Shared Channel (PUSCH) transmission part;

an offset that, when applied to said threshold value, results in a relatively low chance for transmitting a random access message comprising a preamble part and a Physical Uplink Shared Channel (PUSCH) transmission part;

an offset that, when applied to said threshold value, allows the UE to transmit a random access message comprising a preamble part and a Physical Uplink Shared Channel (PUSCH) transmission part irrespective of the RSRP measured by the UE; and an offset that, when applied to said threshold value, prevents the UE from transmitting a random access message comprising a preamble part and a Physical Uplink Shared Channel (PUSCH) transmission part.

(Supplementary Note 11) A method performed by a base station, the method comprising:

broadcasting information identifying a reference signal received power (RSRP) threshold value for transmitting, by a user equipment (UE), a random access message comprising a preamble part and a Physical Uplink Shared Channel (PUSCH) transmission part; and carrying out a random access procedure with said UE based on an RSRP measured by the UE, said RSRP threshold value, and a priority level associated with the UE.

(Supplementary Note 12)

The method according to supplementary note 11, further comprising:

transmitting, to the UE, information identifying at least one respective offset associated with at least one priority level.

(Supplementary Note 13)

The method according to supplementary note 11 or 12, further comprising:

receiving, from said UE, a first random access message (Msg1/MsgA) based on said RSRP measured by the UE, said RSRP threshold value, and an offset associated with a priority level for a connection attempt by the UE.

(Supplementary Note 14)

A user equipment (UE) comprising:

means for receiving information identifying a reference signal received power (RSRP) threshold value for transmitting a random access message comprising a preamble part and a Physical Uplink Shared Channel (PUSCH) transmission part;

means for obtaining information identifying at least one respective offset associated with at least one priority level; and means for determining a type of random access procedure to be performed based on an RSRP measured by the UE, said RSRP threshold value, and a priority level associated with the UE.

(Supplementary Note 15)

A base station comprising:
means for broadcasting information identifying a reference signal received power (RSRP) threshold value for transmitting, by a user equipment (UE), a random access message comprising a preamble part and a Physical Uplink Shared Channel (PUSCH) transmission part; and
means for carrying out a random access procedure with said UE based on an RSRP measured by the UE, said RSRP threshold value, and a priority level associated with the UE.

This application is based upon and claims the benefit of priority from United Kingdom Patent Application No. 2002086.3, filed on Feb. 14, 2020, the disclosure of which is incorporated herein in its entirety by reference.

The invention claimed is:

1. A method performed by a user equipment (UE), the method comprising:
receiving information indicating a reference signal received power (RSRP) threshold value for transmitting a random access message comprising a preamble part and a Physical Uplink Shared Channel (PUSCH) transmission part and information indicating a parameter corresponding to at least one service or type of usage by the UE; and
determining a random access procedure to be performed based on an RSRP measured by the UE, the RSRP threshold value, and the parameter corresponding to the at least one service or type of usage by the UE.

2. The method according to claim 1, further comprising:
determining a priority level for a connection attempt;
wherein the parameter corresponds to the priority level.

3. The method according to claim 1, wherein
the transmitting includes transmitting the random access message in a case where the RSRP measured by the UE is equal to or larger than a sum of the threshold value and an offset corresponding to the parameter corresponding to the at least one service or type of usage by the UE.

4. The method according to claim 1, wherein
the transmitting includes transmitting another random access message comprising a preamble part but no PUSCH transmission part in a case where the RSRP measured by the UE is lower than a sum of the threshold value and an offset corresponding to the parameter corresponding to the at least one service or type of usage by the UE.

5. A method performed by a base station, the method comprising:
transmitting information indicating a reference signal received power (RSRP) threshold value for transmitting, by a user equipment (UE), a random access message comprising a preamble part and a Physical Uplink Shared Channel (PUSCH) transmission part and information indicating a parameter corresponding to at least one service or type of usage by the UE; and
carrying out a random access procedure with the UE based on an RSRP measured by the UE, the RSRP threshold value, and the parameter corresponding to the at least one service or type of usage by the UE.

6. The method according to claim 5, wherein
the receiving includes receiving, from the UE, the random access message based on the RSRP measured by the UE, the RSRP threshold value, and an offset corresponding to the parameter corresponding to at least one service or type of usage by the UE.

7. A user equipment (UE) comprising:
at least one memory storing instructions; and
at least one processor configured to process the instructions to:
receive information indicating a reference signal received power (RSRP) threshold value for transmitting a random access message comprising a preamble part and a Physical Uplink Shared Channel (PUSCH) transmission part and information indicating a parameter corresponding to at least one service or type of usage by the UE; and
determine a random access procedure to be performed based on an RSRP measured by the UE, the RSRP threshold value, and the parameter corresponding to the at least one service or type of usage by the UE.

8. A base station comprising:
at least one memory storing instructions; and
at least one processor configured to process the instructions to:
transmit information indicating a reference signal received power (RSRP) threshold value for transmitting, by a user equipment (UE), a random access message comprising a preamble part and a Physical Uplink Shared Channel (PUSCH) transmission part and information indicating a parameter corresponding to at least one service or type of usage by the UE; and
carry out a random access procedure with the UE based on an RSRP measured by the UE, the RSRP threshold value, and the parameter corresponding to the at least one service or type of usage by the UE.

* * * * *